United States Patent [19]

Watanabe et al.

[11] 4,068,884
[45] Jan. 17, 1978

[54] UNDERSTRUCTURE OF AN AUTOMOTIVE BODY

[75] Inventors: Hiroo Watanabe, Tokyo; Yoshiaki Ocho, Wakoo, both of Japan

[73] Assignee: Honda Giken Kogyo Kabushiki Kaisha, Tokyo, Japan

[21] Appl. No.: 715,209

[22] Filed: Aug. 17, 1976

[30] Foreign Application Priority Data

Sept. 11, 1975 Japan .............................. 50-124379
Sept. 11, 1975 Japan .............................. 50-124380

[51] Int. Cl.$^2$ ............................................. B62D 23/00
[52] U.S. Cl. ................................ 296/28 F; 280/106 R
[58] Field of Search .................... 280/106 R; 296/28 F

[56] References Cited

U.S. PATENT DOCUMENTS 3,078,118  2/1963  Dzienis et al. ..................... 296/28 F
3,423,122  1/1969  Wessells ............................ 296/28 F Primary Examiner—Richard A. Bertsch
Attorney, Agent, or Firm—Haseltine, Lake & Waters

[57] ABSTRACT

An understructure including a dished form of floor panel and an angled dashboard panel secured as by welding to the front side of the dished floor panel to define therebetween a confined hollow space extending transversely of the automotive body. Trough-like side frames are each secured to the adjacent side of the dished floor panel to define thereon a confined hollow space. Even if open gaps remain in the welded joints between the members described, any water possibly rising through such open gaps into the hollow spaces is collected therein and never enters the car room. Sound propagation through the open gaps into the car room is also minimized. Side frames extending forwardly from the dashboard panel and floor frames secured to the underside of the floor panel and integrally joined with the respective side frames make the understructure extraordinarily high in rigidity in cooperation with the hollow spaces formed on the floor panel and, among others, with the transversely extending one.

3 Claims, 7 Drawing Figures

UNDERSTRUCTURE OF AN AUTOMOTIVE BODY

BACKGROUND OF THE INVENTION

This invention relates generally to automotive bodies and more particularly to understructures thereof.

Automotive body understructures having conventionally been formed of a planar floor panel and other members, such as a dashboard panel and side frames, which are secured directly to the peripheral edge of the floor panel by spot welding with appropriate reinforcing members employed at the welded joints to increase the mechanical strengths thereof. Understructures of such conventional form, however, have involved a disadvantage that more or less clearances or open gaps are formed in the welded joints and allow intrusion of water into the car room and sound propagation therein particularly in cases where the joint-forming surfaces of the floor panel, dashboard panel and other members have not been prepared accurately enough. In order to overcome such disadvantage, it is necessary to form the joint-forming surfaces with much higher accuracy while employing additional reinforcing members therefor and this results in reduction in fabrication efficiency and increase in number of component parts required.

SUMMARY OF THE INVENTION

The present invention has for its object the provision of an automotive body understructure which is designed to overcome the difficulties previously met as described above and which is simple in construction.

Another object of the present invention is to provide an automotive body understructure of the character described which enables realization of an automotive body which is reduced in weight, exhibiting improved mechanical strengths under external forces and, among others, a highly improved stiffness or rigidity under twisting forces acting about the longitudinal axis of the vehicle during travel.

According to the present invention, there is provided an automotive body understructure which comprises a dished floor panel including a flat body portion and four side portions rising from the periphery thereof, and a dashboard panel including an angled bottom portion integrally secured to the outer or front surface of the front side portion of the floor panel to define therebetween a confined hollow space of substantially triangular cross section.

According to one aspect of the present invention, the understructure further comprises a pair of trough-like side frames opening sidewise toward each other and each secured along the upper and lower edges thereof to the outer surface of the adjacent one of the two lateral side portions of the dished floor panel to define a confined hollow space on the lateral side portion.

According to another aspect of the present invention, the understructure further comprises a pair of right- and left-hand side frames each secured at the rear end to the angled bottom portion of the dashboard panel and extending forwardly therefrom and a pair of floor frames secured to the underside of the floor panel along the opposite sides thereof and integrally joined at the front end with the respective side frames at the rear end thereof.

The above and other objects, features and advantages of the present invention will become apparent from the following description when taken in conjunction with the accompanying drawings.

DESCRIPTION OF THE PREFERRED EMBODIMENTS

Figure 1:
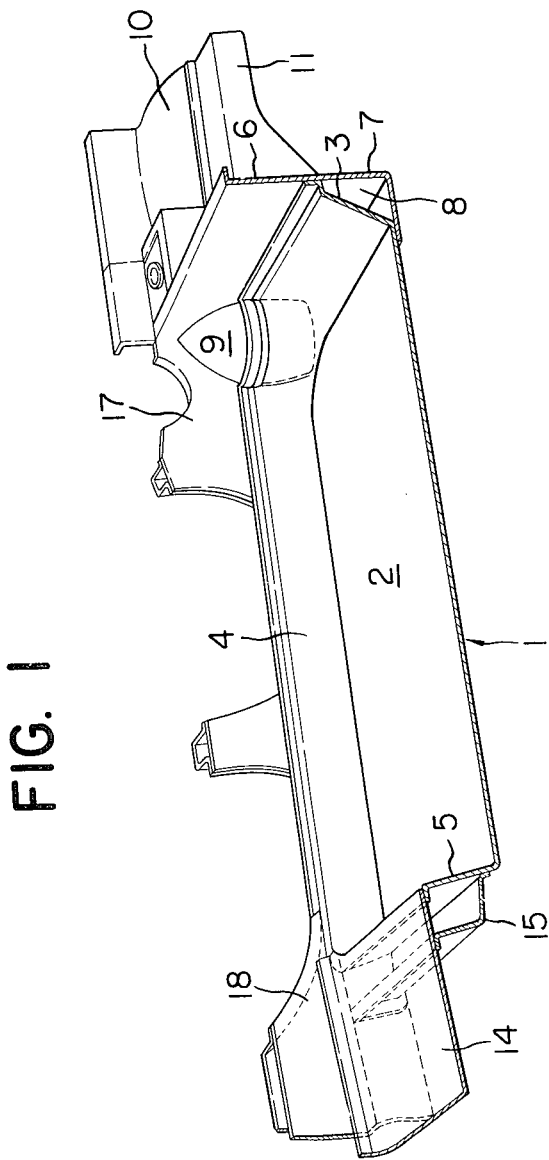
FIG. 1 is a perspective view, in longitudinal cross section, of a preferred embodiment of the invention.
Figure 2:
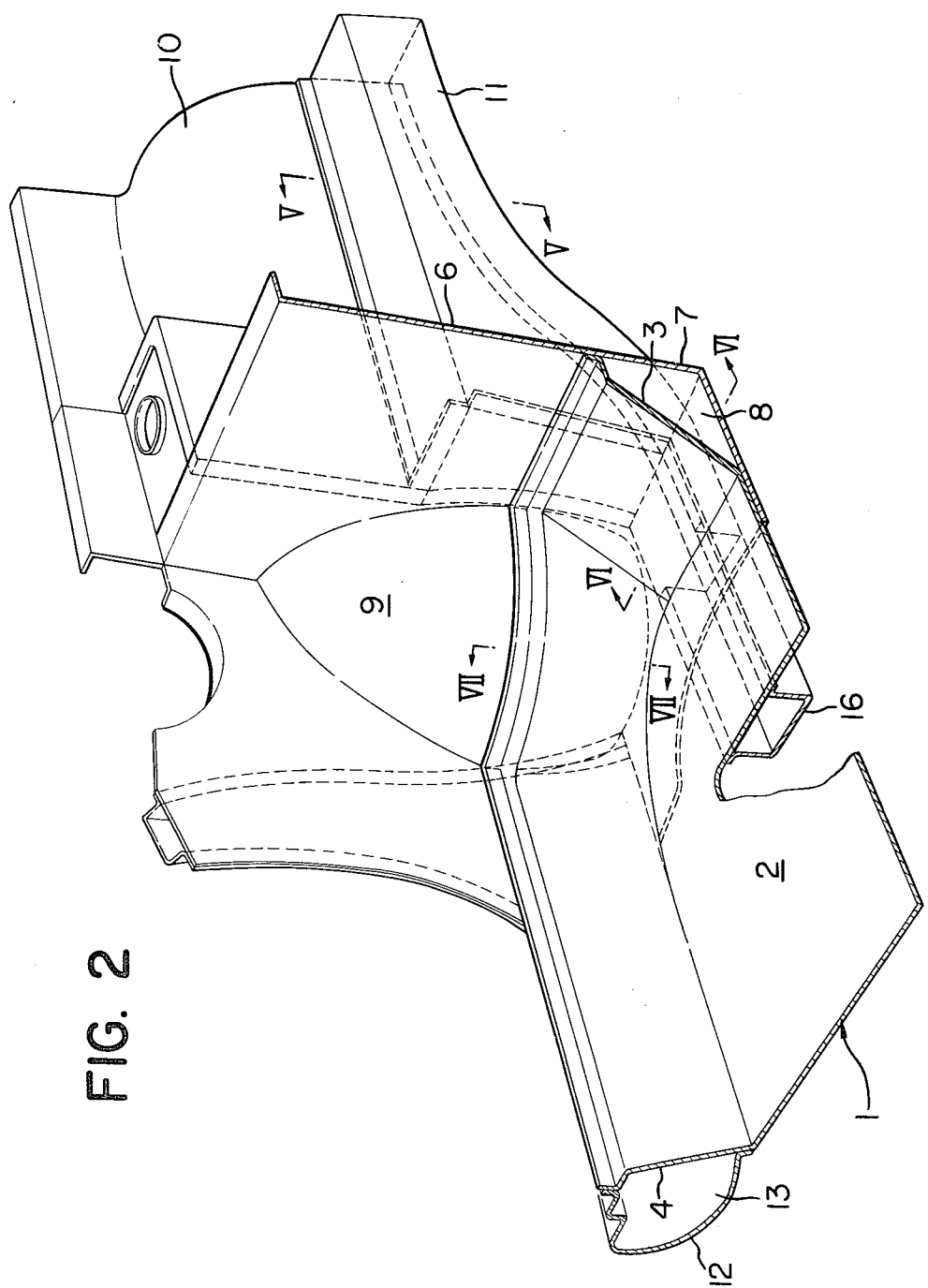
FIG. 2 is a fragmentary perspective view, on an enlarged scale, showing the front end portion of the embodiment of FIG. 1.

Referring to the drawings and first to FIG. 1, reference numeral 1 generally indicates a dished form of floor panel which forms a floor portion of the automotive body and which includes a flat bottom or body portion 2 substantially rectangular in shape and four side portions rising from the periphery of the body portion 2, namely, a front side portion 3, two lateral side portions 4 (only one of which is shown) and a rear side portion 5. Referring also to FIG. 2, reference numeral 6 indicates a dashboard panel having an angled bottom portion 7 spot-welded or otherwise secured to the outer surface of the front side portion 3 of the floor panel 1. In other words, the dashboard panel 6 is of an angular formation, including an upstanding body portion integrally secured to the outer surface of the front side portion 3 of the floor panel 1 along the top edge thereof and a horizontally rearwardly extending bottom portion 7 integrally secured along the rear edge thereof to the front side portion 3 at the bottom thereof. In this manner, there is defined between the front side portion 3 of floor panel 1 and the angled bottom portion 7 of dashboard panel 6 a confined hollow space 8 of substantially triangular cross section which extends transversely of the automotive body.

Referring again to FIGS. 1 and 2, the dashboard panel 6 is bulged rearwardly at its opposite bottom corners, as indicated at 9, to accommodate a pair of front wheels, respectively. As observed, the floor panel 1 is depressed or recessed at its front bottom corners so as to closely conform to the respective bulged portions 9 of the dashboard panel 6.

Reference numeral 11 indicates a pair of side frames which extend longitudinally of the automotive body and forwardly from the respective side edges of the dashboard panel 6 and are each generally of channel section opening laterally outward. The side frames 11 are each connected at the rear end thereof to the front surface of the dashboard panel 6 and each include a rearwardly extended bottom projection which is secured to the underside of the floor panel 1. Secured to the outer, open side of each of the side frames 11 is an outer frame 19 which depends from a wheel housing panel 10, which in turn is secured to the front surface of the dashboard panel 6. Reference numeral 16 indicates a pair of floor frames of U-section which are secured to the underside of the floor panel 1 and extend longitudinally in spaced relation to each other. The floor frames 16 are integrally joined at the front end with the respective side frames 11 at the rear end thereof. As illustrated in FIG. 2, the side frames 11 are each connected sidewise with the adjacent wheel housing panel 10.

Figure 3:
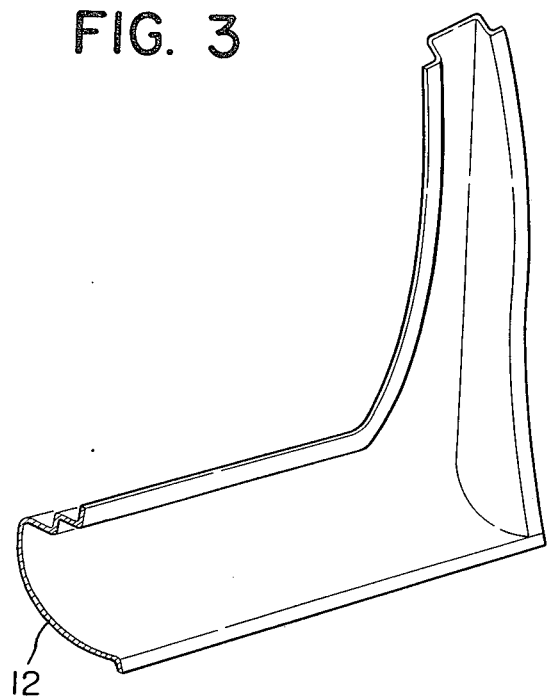
FIG. 3 is a view similar to FIG. 2, showing one of the side frames of the embodiment.
Figure 5:
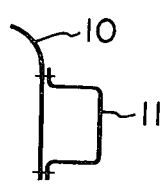
FIG. 5 is a diagrammatic cross-sectional view, taken along the line V—V in FIG. 2.
Figure 6:
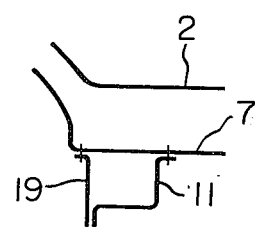
FIG. 6 is a view similar to FIG. 5, taken along the line VI—VI in FIG. 2.
Figure 7:
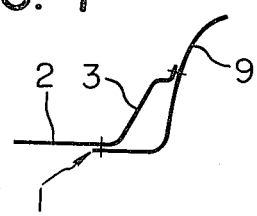
FIG. 7 is a view similar to FIGS. 5 and 6, taken along the line VII—VII in FIG. 2.
Figure 4:
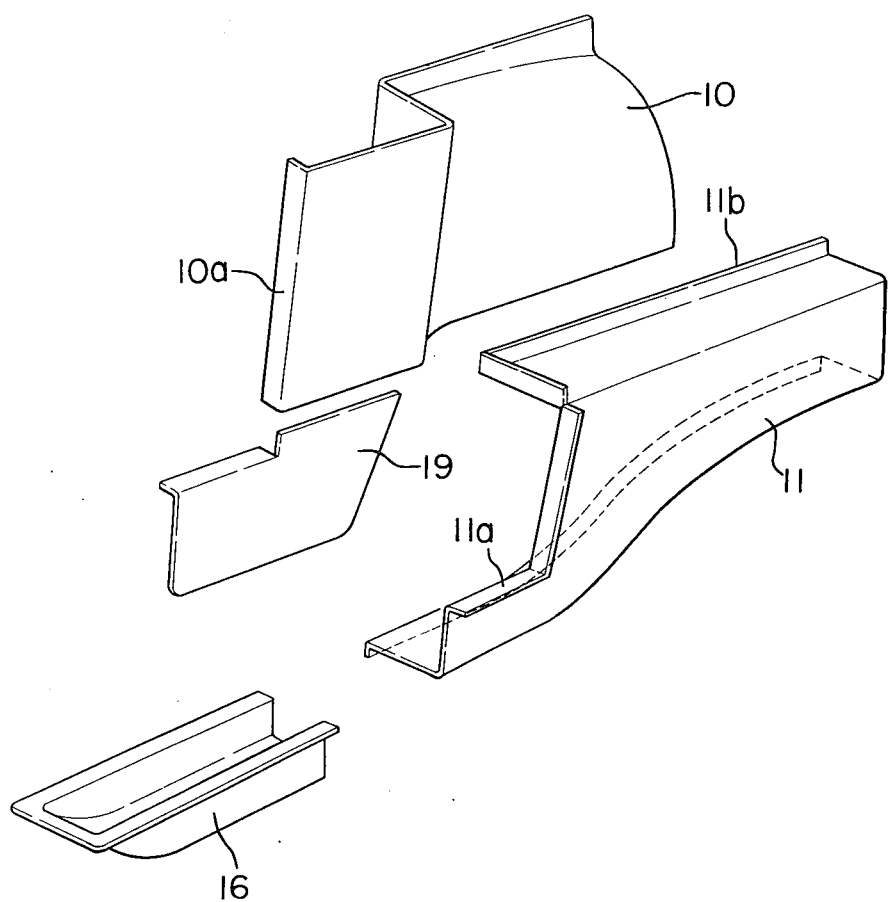
FIG. 4 is an exploded view of a part of the embodiment shown in FIG. 1.

Referring to FIGS. 2 and 3, reference numeral 12 indicates a pair of trough-like side frames opening sidewise toward each other and each integrally secured along the upper and lower edges thereof to the outer surface of the adjacent one of the two lateral side portion 4 of the dished floor panel 1 as by spot welding to define a confined hollow space 13 of generally C-shaped cross section between the side frame 12 and associated lateral side portion 4 of the floor panel 1.

Referring again to FIG. 1, reference numeral 14 indicates a rear floor panel welded to the top edge of the rear side portion 5 of the main or dished floor panel 1 and extending rearwardly therefrom. A transverse frame 15 of anglular section is welded along the opposite edges thereof to the underside of the rear floor panel 14 and the outer surface of the rear side portion 5 of the main floor panel 1, respectively. Reference numerals 17 and 18 respectively indicate a front and a rear side panel upstanding from each of the lateral side portions 4 of the floor panel 1 at the front and rear end thereof.

With the understructure of the present invention, which is constructed and arranged as described above, it will be readily appreciated that even if some open gaps are formed in the welded joints between the underside of floor panel 1 and the bottom edge of the dashboard panel 6 and those between the opposite side surfaces of the floor panel 1, on one hand, and the bottom edges of the side frames 12, on the other hand, any water possibly rising through the open gaps is collected in the confined hollow space 8 or 13 and there is no intrusion of such water into the car room. In addition, any sound passing through the open gaps into the spaces 8 and 13 is effectively muffled therein and its propagation into the car room is materially reduced.

It will also be appreciated that the formation of confined hollow spaces 8 and 13 between the periphery of the floor panel 1 and the dashboard panel 6 and side frames 12 enables the component members to be connected with increased rigidity without necessitating use of any reinforcing members.

Further, in the understructure of the present invention, each set of side and floor frames 11 and 16 in effect forms a longitudinally extending integral member of substantial rigidity and, in combination with the transversely extending confined hollow space 8, forms a cross structure which is very rigid. This enables the understructure to exhibit a highly improved rigidity under external forces and particularly under twisting forces acting on the automotive body about the longitudinal axis thereof.

Though one preferred embodiment has been shown and described, it will be readily understood by those skilled in the art that many changes and modifications may be made therein without departing from the spirit of the invention or the scope of the appended claims.

What is claimed is:

1. An understructure for an automotive body comprising:
    a dished floor panel having a single continuous flat body portion and four side portions rising from the periphery thereof;
    an angled dashboard panel defined by an upstanding body portion integrally secured to the outer surface of a front side portion of said floor panel along a top edge thereof, and a horizontally rearwardly extending bottom portion integrally secured along the rear side edge thereof to said front side portion of said floor panel at said bottom thereof, both said body portion and said bottom portion transversely extending from side to side of said automotive body so as to define, in cooperation with said front side portion of said floor panel, a first hollow reinforcing beam of substantially triangular cross-section extending transversely and continuously from side to side of said automotive body;
    a pair of trough-like side frames opening sidewise toward each other and integrally secured along the upper and lower edges thereof, to the outer surfaces of the adjacent lateral side portions of said floor panel to define a pair of second longitudinally extending hollow reinforcing beams, said second reinforcing beams being integrally and continuously connected at their front ends with said first reinforcing beam at its lateral sides forming a continuous hollow space.

2. An understructure as claimed in claim 1 comprising: a pair of reinforcing members extending longitudinally in spaced parallel relation with each other, said members each having a laterally outwardly opened forward portion secured sidewise to an associated front wheel housing panel defining a confined hollow space, and an upwardly opened rearward portion, secured at its top to said underside of said dished floor panel, defining another hollow space, said forward and rearward portions, respectively, being connected to form a third continuous reinforcing hollow beam extending longitudinally across said first transverse reinforcing.

3. An understructure as claimed in claim 2, comprising: a rear floor panel secured at its front end to said rear side portion of said dished floor panel at the top edge thereof, and an angular transverse frame secured to said rear side portion of said dished floor panel and to said rear floor panel to thereby form a fourth reinforcing hollow beam extending in the transverse direction with respect to said automotive body.

* * * * *